May 10, 1949. W. B. JUTTE 2,469,560
INDICATOR PLUG
Filed May 20, 1946 2 Sheets-Sheet 1
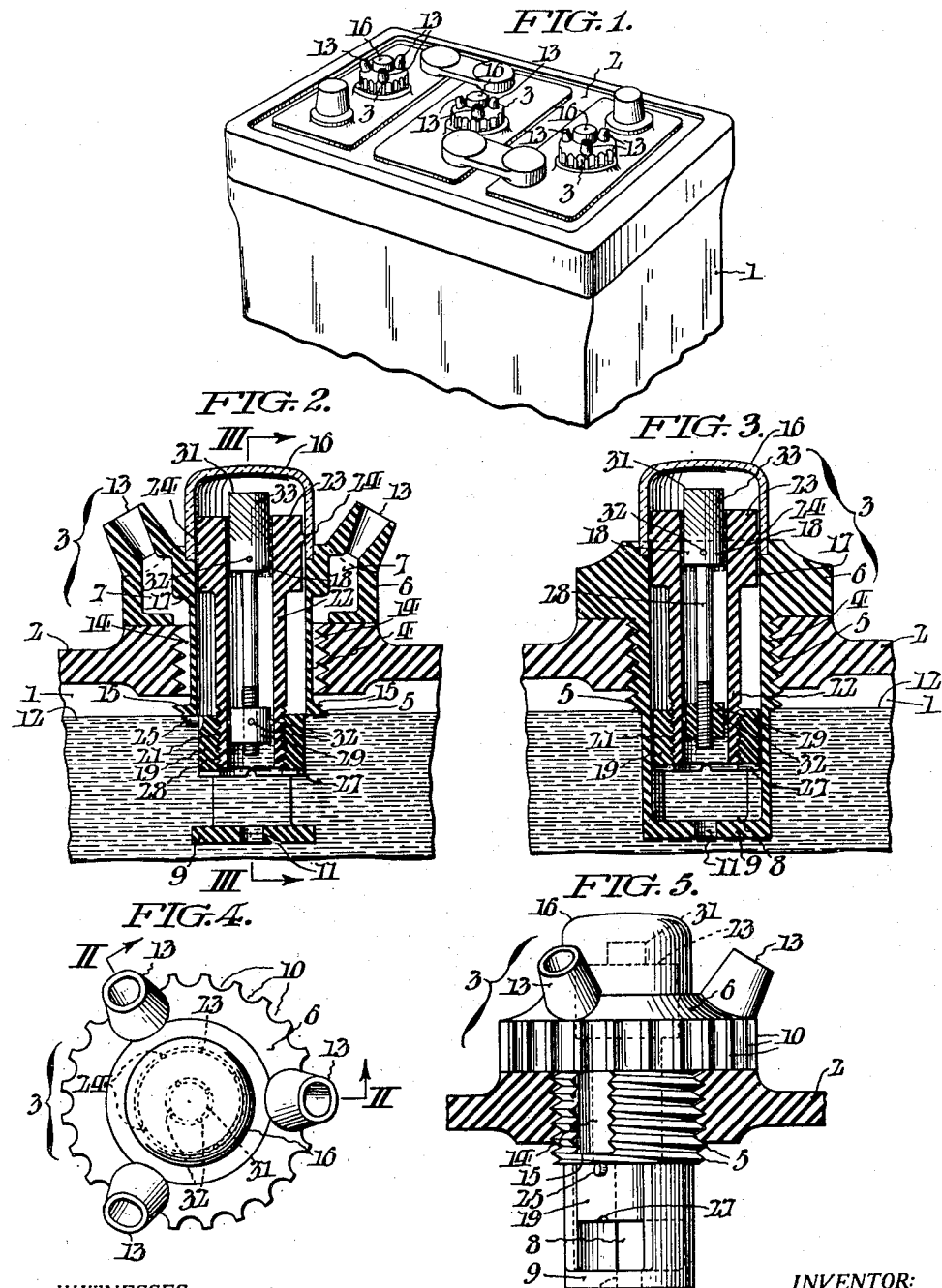
INVENTOR:
William B. Jutte,
BY Paul & Paul
ATTORNEYS.

May 10, 1949. W. B. JUTTE 2,469,560
INDICATOR PLUG
Filed May 20, 1946 2 Sheets-Sheet 2
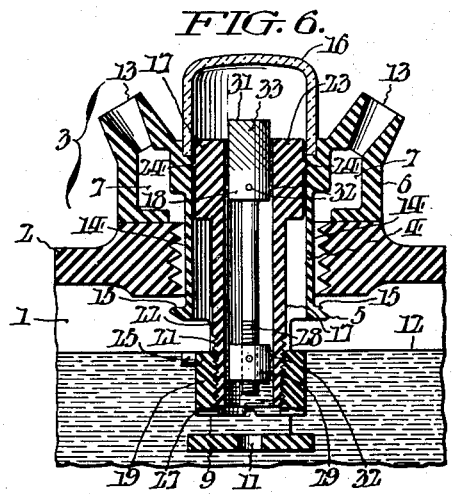
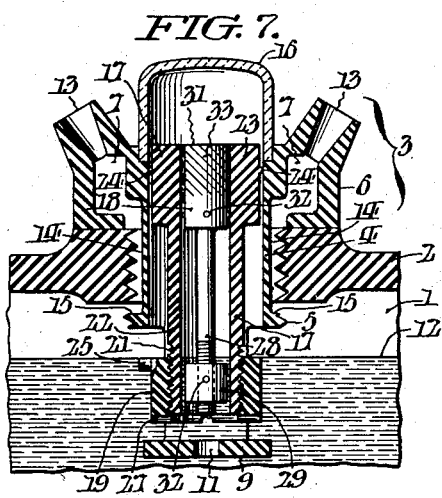
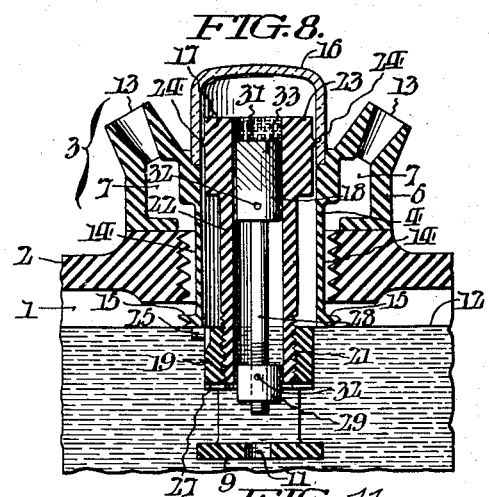
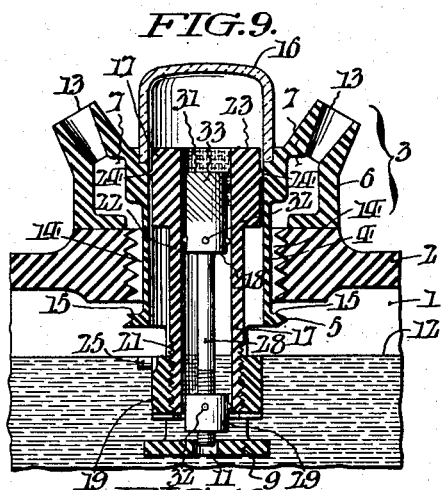
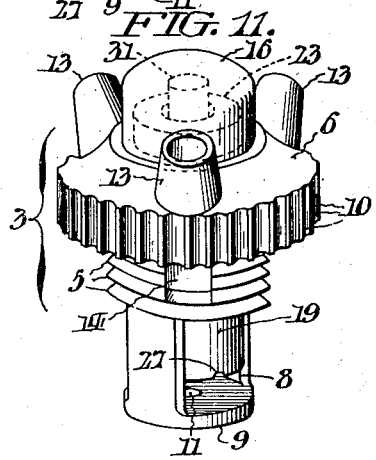
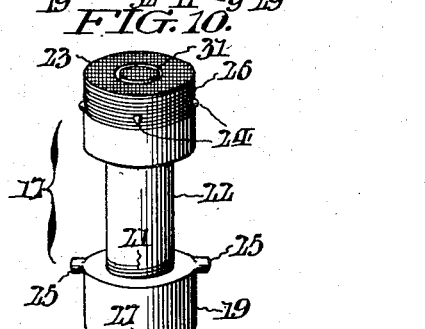
INVENTOR:
William B. Jutte,
BY Paul & Paul
ATTORNEYS.

Patented May 10, 1949

2,469,560

UNITED STATES PATENT OFFICE 2,469,560

INDICATOR PLUG

William B. Jutte, Philadelphia, Pa.

Application May 20, 1946, Serial No. 670,988

15 Claims. (Cl. 136—182)

1

This invention relates to indicator plugs for electric storage batteries or the like, and more particularly to a plug which is designed to serve as substitute for the vented plug which is commonly employed in detachable engagement with the filling opening in the top wall of a battery cell.

One object of the invention is to provide an indicator plug which embodies filling and venting means in combination with an indicator visible exteriorly of the battery cell which makes it possible not only to ascertain at all times the condition of the same but also to fill any cell when the liquid therein is below the desired level, while observing the effect of the introduction of additional liquid; all without the necessity of removing the indicator plug or without impairing the normal venting function of the plug.

Another object of the invention is to provide an indicator plug in the form of a closure member having a number of projecting nipples with separate independent passages leading thereto, such nipples being equally spaced around the circumference of the closure member in such manner as not to impair the visibility of the indicator. Such a combination insures that regardless of how or where the battery may be situated, or how the closure may be turned within the opening in which it is accommodated, the battery can always be filled from the most convenient side. Moreover, when one such nipple is used for filling, one or more other nipples will serve to vent the cell to the atmosphere. An incidental advantage of the novel form of nipple which is employed for filling and venting is that it is designed to receive any form of filling connection or hose commonly employed for introducing distilled water to a battery.

Another object of the invention is to provide in a closure member of the character described means which provide an indication of the condition of the battery visible exteriorly all around the circumference of the plug and having prominent and contrasting characteristics so that one can see at a glance whether the battery needs attention.

How these ends are accomplished as well as other objects and advantages characterizing my invention will become more apparent from the description of an embodiment thereof as applied to an electric storage battery which follows hereinafter having reference to the accompanying drawings, whereof:

Fig. 1 represents a perspective view of an electric storage battery equipped with indicator plugs embodying the invention;

Fig. 2 is an enlarged vertical cross section of the indicator plug and a portion of the battery taken as indicated by the arrows II—II of Fig. 4, and showing the elements of the indicator in the positions which they assume when the battery is fully charged and the liquid level is near the top thereof;

Fig. 3 is a vertical cross section of the same taken as indicated by the arrows III—III of Fig. 2;

Fig. 4 is a top plan view of the indicator plug;

Fig. 5 is a side elevation of the same showing a portion of the top wall of the battery in section;

Figs. 6, 7, 8 and 9 are views similar to that of Fig. 2 showing the elements of the indicator in the positions which they assume under the following conditions: low liquid level and high charge (Fig. 6); low liquid level and medium charge (Fig. 7); high liquid level and low charge (Fig. 8); and low liquid level and low charge (Fig. 9);

Fig. 10 is a perspective view of the indicating means removed from the closure member; and Fig. 11 is a perspective view of the complete indicator plug.

With reference to the drawings the battery 1 depicted in Fig. 1 is of a conventional type having three cells each equipped with a filling opening in the top wall 2 having an indicator plug 3 embodying my invention applied thereto.

In the illustrated example the indicator plug 3 consists of a closure member having a central tubular shank 4 externally threaded at 5 to detachably engage corresponding threads in the top wall 2 of the battery, and having a surrounding body 6 subdivided into separate hollow compartments 7. At its lower end the tubular shank 4 has two relatively large rectangular openings 8 beneath which there is an end plate 9 having a smaller opening 11. When the indicator plug is applied to a battery the electrolyte 12 is free to flow through the openings 8 and 11 and to rise to the same level as that which surrounds the tubular shank 4, so that a sample of the electrolyte is present within the submerged part of the closure member which is representative of the liquid level and state of charge of the particular cell.

The body portion 6 of the indicator plug is circumferentially corrugated as shown at 10 in Fig. 4 so as to afford a convenient hand grip and has a number of upwardly and outwardly projecting nipples 13 equally spaced around its circumference. Each nipple is associated with a compartment 7 and serves as a means for filling and venting the battery. In order that the nipples 13 may serve as a convenient means for attachment of a hose or other filling connection they are tapered externally narrowing towards the open top and are reversely tapered internally. This permits the application thereto of hoses of varying diameter. By virtue of the construction of the nipples, their disposition and inclination, the amount of dust or foreign matter which may enter the battery is minimized. The various parts of the closure member may be made of any suitable acid-resistant material, for example, of plastic material in which certain sections or parts may be molded separately and then fused or otherwise bonded together to form an integral structure of the desired shape.

Each compartment 7 within the body 6 has a passage leading therefrom to the interior of the cell, such passages being in the form of vertical grooves 14 cut through the threads 5 of the plug and terminating at a shoulder 15 formed at the lower ends of the threads. The shoulder 15 serves to deflect water admitted through the nipples 13 so that such entering water is diffused at the top of the cell for a purpose later described. It will be noted that the hollow compartments 7 and the passages 14 leading therefrom are separate and independent, there being no direct communication between one filling opening and another, or between a filling opening and the space in which the indicating means are housed. It results that when one nipple 13 is used for filling the other nipples will function as vents and there will be no tendency for the entering water to surge upwardly or pass from one nipple 13 to another. Moreover, the interior construction of the plug is such as to prevent splash or leakage while permitting the cell to be properly vented to the atmosphere at all times.

At the top of the plug a transparent dome 16 is provided through which the indicating means housed within the plug are clearly visible all around the circumference of the plug. Such indicating means in the preferred form of the invention comprise a liquid-level-indicating float 17 and a hydrometer 18 movable vertically and independently within the plug and arranged concentrically one within the other. The upper ends of these elements afford external indicia, visible through the transparent dome 16, of the level and density of the liquid in the battery.

The liquid-level-indicating float 17 comprises two inter-engaging threaded parts. Its base 19 is internally threaded to engage corresponding threads, as indicated at 21, on the relatively narrow cylindrical portion 22. The upper end 23 is enlarged and substantially fills the tubular shank 4 of the plug having capacity to slide freely therein with the friction between these parts minimized by having their mutual engagement confined to the pointed ends of projections 24 on the upper end 23 of the float 17, shown most clearly in Fig. 10. On the base member 19 of the float 17 additional projections 25 are formed which serve as stop elements limiting the upward movement of the float by contact with the shoulder 15 on the tubular shank 4. Downward movement of the float 17 is limited by the end plate 9. The range of the float 17 is limited to movement between a position indicating that the battery needs refilling and a position indicating that the battery is filled to a proper level.

Desirably the float 17, including its base member 19, is constructed of very light acid-resistant and buoyant material, preferably of plastic, so as to assume positions approximating those shown in Figs. 2, 3 and 6 to 9, dependent upon the liquid level in the battery. As indicated at 26 in Fig. 10, the upper end 23 is colored or otherwise formed with some characteristic which contrasts sharply with the surrounding parts of the closure member so that the relative vertical position of the float stands out prominently to the observer. Grooves 27 are formed at the bottom of the base member 19 to prevent any tendency for the float to stick to the base member.

The hydrometer 18 consists of a threaded stem 28 having an internally threaded base member 29 at its lower end and having an enlarged upper end 31. Projections 32 adapted to engage the inner cylindrical wall of the float 17 are formed both on the upper end 31 and on the base member 29 so that the hydrometer 18 may slide freely with a minimum of friction. As indicated at 33, the hydrometer is also colored or formed with some characteristic which contrasts with the upper end 23 of the float 17 and the surrounding parts of the closure member so that its position stands out prominently to the observer. The hydrometer 18, including its base member 29, may be made of light weight, acid-resistant and buoyant material, preferably of plastic.

When the battery is fully charged and the liquid level is high the upper extremities of the ends 23 and 31 of the float 17 and hydrometer 18 will appear one above the other with both above the top of the plug as shown in Figs. 2 and 3. If the liquid level falls to a low point but the charge remains high then only the upper end 31 of the hydrometer 18 will appear above the plug as shown in Fig. 6. If there is a condition of medium charge and low liquid level no part of the float 17 or hydrometer 18 will project above the top of the plug, the parts assuming the positions represented in Fig. 7. If the charge is low and the liquid level is high only the upper end 23 of the float 17 will be visible, this situation being represented in Fig. 8. Finally, if the charge is low and the liquid level is low the float 17 and hydrometer 18 will both be obscured as shown in Fig. 9.

As an example of a suitable material which may be used for the parts of the liquid-level-indicating device 17, including particularly its base member 19, and for the parts of the hydrometer 18, including particularly its base member 29, all such parts may be made of a phenol-formaldehyde resin and may be molded with internal voids or hollow spaces to add to their buoyancy.

By constructing the float 17 and hydrometer 18 with each of these elements comprising inter-engaging threaded parts the effective length of either or both of such elements may be varied, either as initially fabricated and assembled or after incorporation in a closure member. Such variation makes it possible to manufacture these elements as non-precision devices, with resulting reduction in the cost of manufacture, and by later adjustment to adapt them to measure within reasonable limits of accuracy the condition of any of the standard types of batteries. After adjustment to the proper length the two threaded parts may be cemented or otherwise permanently joined together. When properly adjusted as to length the float and hydrometer herein described and illustrated give an accurate indication of the conditions desired to be known with respect to the liquid level and state of charge.

If the battery needs to be refilled water can be added through any of the nipples 13 and by watching the upper end 23 of the float 17 the operator can determine, before any overflow occurs, that the battery has been filled to capacity, or nearly so. Moreover, the introduction of water does not cause turbulence within the lower end of the plug or localized dilution of the sample of the electrolyte within which the indicating means are partially submerged, because the water thus added is diffused when it strikes the shoulder 15 at the base of the threads 5 and is caused to be spread throughout the top of the cell towards the side walls of the battery. Hence the indicating means continue to register accurately the condition of the battery during the filling operation.

It will be particularly noted that the indicator plug of this invention is so formed that the battery can always be filled and its condition observed from whatever side is most convenient. Batteries are installed in different positions in motor vehicles and frequently convenient access to the top of a battery can only be had from certain sides thereof. Furthermore, the openings in the top walls of batteries are not uniformly threaded. With the use of an indicator plug made in accordance with this invention, these factors become unimportant because, regardless of the position of the battery or how each plug may be turned with respect to the opening in which it is fitted, access can be had to one or more of the nipples 13 and the upper ends of the indicating means may be seen from any angle of view around the top of the plug.

While I have described one embodiment of my invention in considerable detail showing the preferred form in which the indicator plug is constructed, it will be apparent that various changes may be made in the specific form of the plug and indicating means and that certain features of the invention may be used to advantage without use of other features, all without departing from the spirit of the invention as defined in the annexed claims.

Having thus described my invention, I claim:

1. An indicator plug for electric storage batteries comprising a closure member having means for detachably engaging the top wall of a battery cell at an opening therein, and an indicator consisting of a movable element of such material and so positioned within said closure member that it is adapted to float in the liquid of the battery and extending above the closure member to afford, by means of the varying visible area of the indicator, external indicia of the condition of the battery, said closure member having a plurality of independent passages isolated from the space in which the indicator is housed and extending from separate openings to the atmosphere at the top of the closure member, through which the battery may be filled and vented, to the area surrounding the base of said closure member.

2. An indicator plug for electric storage batteries comprising a closure member and an indicator of such material and so positioned within said closure member that it is adapted to float in the liquid of the battery, said indicator extending through the closure member and terminating above it to afford, by means of the varying visible area of the indicator, external indicia of the condition of the battery, and said closure member having a plurality of projections surrounding said indicator at the top of said closure member and having independent passages leading from openings in said projections to the area surrounding the base of the plug whereby the battery may be simultaneously filled and vented.

3. An indicator plug as defined in claim 2 wherein the projections at the top of said closure member are in the form of nipples equally spaced around the circumference of said closure member.

4. An indicator plug as defined in claim 2 wherein the projections at the top of said closure member are in the form of nipples reversely tapered internally and externally.

5. An indicator plug as defined in claim 2 wherein the independent passages include vertical grooves formed at the surface of said closure member.

6. An indicator plug as defined in claim 2 wherein the independent passages include vertical grooves formed at the surface of said plug and means for deflecting liquid entering the battery through said grooves away from the base of said closure member.

7. An indicator plug for electric storage batteries comprising a threaded closure member and an indicator of such material and so positioned within said closure member that it is adapted to float in the liquid of the battery, said indicator extending through the closure member and terminating above it to afford, by means of the varying visible area thereof, external indicia of the condition of the battery, and said closure member having a plurality of similarly formed outwardly projecting nipples having openings therein adapted for filling and venting the battery, and a transparent dome affixed to the top of the closure member to house the upper end of the indicator, said projecting nipples being spaced around the circumference of the closure member in surrounding relation to said dome.

8. An indicator plug for electric storage batteries comprising a closure member having means for detachably engaging the top wall of a battery cell at an opening therein, and an indicator comprising a liquid-level-indicating float and a hydrometer movable vertically and independently within said closure member and arranged concentrically one within the other with their upper ends affording external indicia, visible all around the circumference of the top of said closure member, of the level and density of the liquid in the battery, said closure member having filling inlets surrounding said indicator but not obstructing its visibility through which the battery may be filled and vented.

9. An indicator plug for electric storage batteries comprising a closure member having means for detachably engaging the top wall of a battery cell at an opening therein and an indicator comprising a liquid-level-indicating float and a hydrometer, each so positioned within the closure member as to contact the liquid in the battery and float therein, each mounted for vertical and independent movement within said closure member and affording, by means of the varying visible area of its upper extremity, external indicia of the condition of the battery, and each consisting of separate elements having an adjustable connection between them for varying its effective length to render visible predetermined lengths of the upper extremities of said float and hydrometer, one above the other and each above the closure member, when the liquid in the battery has the desired level and density.

10. An indicator plug for electric storage batteries comprising a closure member having means for detachably engaging the top wall of a battery cell at an opening therein, and an indicator comprising a liquid-level-indicating float and a hydrometer, each so positioned within the closure member as to contact the liquid in the battery and float therein each mounted for vertical and independent movement within said closure member and affording, by means of the varying visible area of its extremity, external indicia of the condition of the battery, and each comprising inter-engaging threaded parts whereby the effective length of the float and hydrometer may be varied to render visible predetermined lengths of the upper extremities of said float and hydrometer, one above the other and each above the closure member, when the liquid in the battery has the desired level and density.

11. An indicator plug for electric storage batteries comprising a closure member having means for detachably engaging the top wall of a battery cell at an opening therein, and an indicator comprising a liquid-level-indicating float and a hydrometer, each so positioned within the closure member as to contact the liquid in the battery, and each mounted for vertical and independent movement within said closure member and affording, by means of the varying visible area of its extremity, external indicia of the condition of the battery, the float comprising inter-engaging threaded parts whereby its effective length may be varied to render visible predetermined lengths of the upper extremities of said float and hydrometer, one above the other and each above the closure member, when the liquid in the battery has the desired level and density, and means for limiting the range of the float to movement between a position indicating that the battery needs refilling and a position indicating that the battery is filled to a proper level.

12. An indicator plug for electric storage batteries comprising a closure member having means for detachably engaging the top wall of a battery cell at an opening therein, and an indicator comprising a liquid-level-indicating float and a hydrometer, each so positioned within the closure member as to contact the liquid in the battery, each in the form of a cylinder, disposed in concentric relation to each other, each adjustable as to its effective length, and each movable vertically and independently within said plug, the upper extremities of said cylinders and the top of said closure member having contrasting characteristics so that the positions of the upper extremities of said cylinders relative to each other and to said closure member be clearly seen, and said cylinders being so proportioned and adjusted that under certain battery conditions the upper extremities of one or both said cylinders will be obscured by the top of the closure member and under other conditions both of said cylinders will project above the top of said closure member with the end of one cylinder above the end of the other, or obscured by the end of the other.

13. An indicator plug for electric storage batteries comprising a closure member adapted to engage detachably the top wall of a battery cell at an opening therein and having a central tubular shank and a surrounding body subdivided into separate hollow compartments, each having passages independently communicating with the battery cell, and an indicator so positioned within the closure member as to contact the liquid in the battery cell and extending through the tubular shank of said closure member and terminating above it to afford, by means of the varying visible area of the indicator, external indicia of the condition of the battery, said closure member having separate openings to the atmosphere at the top thereof communicating with said hollow compartments and providing means for filling and venting the battery cell while the operator observes said indicator, and said compartments and passages being isolated from the space in which the indicator is housed.

14. An indicator plug for electric storage batteries comprising a threaded closure member for engaging the top wall at a battery cell of an opening therein and having a central tubular shank and a surrounding body subdivided into separate hollow compartments, each independently communicating with the battery cell through vertical grooves formed in the threads of said closure member and an indicator so positioned within the closure member as to contact the liquid in the battery cell and extending through the tubular shank of said closure member and terminating above it to afford indicia, by means of the varying visible area of the indicator, visible all around the circumference of said closure member of the condition of the battery, said closure member having openings at the top thereof communicating with said hollow compartments and providing a means for filling and venting the battery cell while the operator observes said indicator.

15. An indicator plug for electric storage batteries comprising a threaded closure member engaging the top wall of a battery cell at an opening therein, and having a central tubular shank and a surrounding body subdivided into separate hollow compartments, each independently communicating with the battery cell through vertical grooves formed in the threads of said closure member, and an indicator so positioned within the closure member as to contact the liquid in the battery cell and extending through the tubular shank of said plug and terminating above it to afford external indicia, by means of the varying visible area of the indicator, visible all around the circumference of said closure member, of the condition of the battery, said closure member having openings at the top thereof communicating with said hollow compartments and providing a means for filling and venting the battery cell while the operator observes said indicator, and shoulders at the lower ends of said vertical grooves for deflecting liquid entering the battery towards the side walls thereof.

WILLIAM B. JUTTE.

REFERENCES CITED

The following references are of record in the file of this patent:

UNITED STATES PATENTS

| Number | Name | Date |
|---|---|---|
| 1,482,852 | Kloepper | Feb. 5, 1924 |
| 1,911,811 | Coote | May 30, 1933 |
| 1,967,800 | Woodbridge | July 24, 1934 |